United States Patent
Agawa

(10) Patent No.: US 8,858,069 B2
(45) Date of Patent: Oct. 14, 2014

(54) OPTICAL FIBER TEMPERATURE DISTRIBUTION MEASURING DEVICE

(75) Inventor: Hisao Agawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 141 days.

(21) Appl. No.: 13/164,975

(22) Filed: Jun. 21, 2011

(65) Prior Publication Data

US 2011/0310925 A1 Dec. 22, 2011

(30) Foreign Application Priority Data

Jun. 22, 2010 (JP) .................................. 2010-141538
Oct. 29, 2010 (JP) .................................. 2010-243399

(51) Int. Cl.
*G01K 15/00* (2006.01)
*G01K 11/00* (2006.01)
*G01K 11/32* (2006.01)

(52) U.S. Cl.
CPC .......... *G01K 11/32* (2013.01); *G01K 2011/324* (2013.01); *G01K 15/005* (2013.01)
USPC ............... 374/1; 374/161; 374/131; 374/121; 374/124; 374/137

(58) Field of Classification Search
USPC ..................... 374/1, 161, 131, 137, 121, 124
See application file for complete search history.

(56) References Cited

U.S. PATENT DOCUMENTS

| | | | | |
|---|---|---|---|---|
| 5,054,935 A * | 10/1991 | Tanabe et al. | .................. | 374/131 |
| 5,102,232 A * | 4/1992 | Tanabe et al. | .................. | 374/131 |
| 6,547,435 B1 * | 4/2003 | Grosswig et al. | ............. | 374/137 |
| 7,742,892 B2 * | 6/2010 | Fromme et al. | ............... | 702/104 |
| 7,744,275 B2 * | 6/2010 | Kawauchi et al. | ............ | 374/131 |
| 2003/0234921 A1 * | 12/2003 | Yamate et al. | ................ | 356/73.1 |
| 2003/0236626 A1 * | 12/2003 | Schroeder et al. | .................. | 702/6 |
| 2006/0210269 A1 * | 9/2006 | Farhadiroushan et al. | ..... | 398/48 |
| 2007/0165691 A1 * | 7/2007 | Taverner et al. | .............. | 374/120 |
| 2007/0171402 A1 * | 7/2007 | Watley et al. | ................. | 356/73.1 |
| 2007/0223556 A1 * | 9/2007 | Lee et al. | .......................... | 374/1 |
| 2008/0040062 A1 * | 2/2008 | Kalar et al. | ..................... | 702/99 |
| 2009/0059996 A1 * | 3/2009 | Komeda et al. | ............... | 374/161 |
| 2010/0128756 A1 * | 5/2010 | Lee et al. | ...................... | 374/161 |
| 2011/0231135 A1 * | 9/2011 | Suh et al. | ........................ | 702/99 |
| 2013/0028289 A1 * | 1/2013 | Zhang et al. | .................. | 374/161 |
| 2013/0100984 A1 * | 4/2013 | Agawa | ............................ | 374/161 |
| 2013/0180330 A1 * | 7/2013 | Gao et al. | ...................... | 73/32 A |
| 2014/0146850 A1 * | 5/2014 | Kasajima et al. | ............. | 374/161 |

FOREIGN PATENT DOCUMENTS

| | | |
|---|---|---|
| GB | 2 453 264 A | 4/2009 |
| JP | 2004-069685 A | 3/2004 |
| JP | 2006-71532 A | 3/2006 |
| JP | 2008-249515 A | 10/2008 |
| JP | 2009-174987 A | 8/2009 |

OTHER PUBLICATIONS

Communication dated Mar. 28, 2014 issued by the European Patent Office in counterpart European Patent Application No. 11170566.1.

* cited by examiner

*Primary Examiner* — Mirellys Jagan
(74) *Attorney, Agent, or Firm* — Sughrue Mion, PLLC

(57) ABSTRACT

There is provided an optical fiber temperature distribution measuring device which measures a temperature distribution along an optical fiber (3) using backward Raman scattering light generated in the optical fiber. The device includes: a reference temperature thermometer (11) disposed in the vicinity of the optical fiber so as to measure a reference temperature (T1, T2) of the optical fiber; an arithmetic controller (7) that calculates a temperature (T) of the optical fiber based on the backward Raman scattering light; and a temperature corrector (12) that corrects the calculated temperature (T) based on a correction formula containing the reference temperature as a parameter.

6 Claims, 9 Drawing Sheets

OPTICAL FIBER TEMPERATURE DISTRIBUTION MEASURING DEVICE

This application claims priority from Japanese Patent Applications No. 2010-141538, filed on Jun. 22, 2010, and No. 2010-243399, filed on Oct. 29, 2010, the entire contents of which are herein incorporated by reference.

BACKGROUND

1. Technical Field

Embodiments described herein relate to an optical fiber temperature distribution measuring device using backward Raman scattering light.

2. Related Art

Among distribution measuring devices using an optical fiber as a sensor, there is a temperature thermometer which measures a temperature distribution along an optical fiber. This technique utilizes backward scattering light that is generated in an optical fiber.

Among various type of backward scattering light such as Rayleigh scattering light, Brillouin scattering, and Raman scattering light, backward Raman scattering light which has high temperature dependence is used for temperature measurements. A measurement is performed by wavelength-dividing backward Raman scattering light. Backward Raman scattering light has two types, that is, anti-Stokes light AS having a shorter wavelength than incident light and Stokes light ST having a longer wavelength than incident light.

Optical fiber temperature distribution measuring devices measure anti-Stokes light intensity $I_{as}$ and Stokes light intensity $I_{st}$, calculate a temperature from their ratio, and display a temperature distribution along the optical fiber. Such optical fiber temperature distribution measuring devices are used in such fields of temperature management of plant facilities, research and study relating to disaster prevention, and air-conditioning of big constructions.

FIG. 8 is a block diagram showing the configuration of an example basic optical fiber temperature distribution measuring device. As shown in FIG. 8, a light source 1 is connected to an input port of an optical demultiplexer 2 and an optical fiber 3 is connected to an input/output port of the optical demultiplexer 2. A photoelectric converter (hereinafter referred to as an O/E converter) 4st is connected to one output port of the optical demultiplexer 2 and an O/E converter 4as is connected to the other output port the optical demultiplexer 2.

An output terminal of the O/E converter 4st is connected to a arithmetic controller 7 via an amplifier 5st and an A/D converter 6st. An output terminal of the O/E converter 4as is connected to the arithmetic controller 7 via an amplifier 5as and an A/D converter 6as. The arithmetic controller 7 is connected to the light source 1 via a pulse generator 8.

The light source 1, which is a laser diode, for example, emits pulse light in synchronism with a timing signal that is supplied from the arithmetic controller 7 via the pulse generator 8. The optical demultiplexer 2 receives, at its input port, the pulse light emitted from the light source 1, and provides the received pulse light to the optical fiber 3 from its input/output port. The optical demultiplexer 2 receives, at its input port, backward Raman scattering light that is generated in the optical fiber 3 and wavelength-divides the backward Raman scattering light into Stokes light and anti-Stokes light. The optical fiber 3 receives, at its input port, the pulse light from the optical demultiplexer 2, and provides the backward Raman scattering light to the optical demultiplexer 2 from its input port.

The O/E converters 4st and 4as are photodiodes, for example. The Stokes light that is output from the one output port of the optical demultiplexer 2 is provided to the O/E converter 4st, and the anti-Stokes light that is output from the other output port of the optical demultiplexer 2 is provided to the O/E converter 4as. The O/E converters 4st and 4as are configured to generate electrical signals corresponding to the received light beams, respectively.

The amplifiers 5st and 5as amplify the electrical signals that are output from the O/E converters 4st and 4as, respectively. The A/D converters 6st and 6as convert signals that are output from the amplifiers 5st and 5as into digital signals, respectively.

The arithmetic controller 7 calculates a temperature based on the digital signals that are output from the A/D converters 6st and 6as, that is, from an intensity ratio between the two components (Stokes light and anti-Stokes light) of the backward scattering light, and displays, on a display unit (not shown), a temperature distribution along the optical fiber 3 based on a resulting time series of temperatures. A relationship between the intensity ratio and the temperature is stored in the arithmetic controller 7 in advance in the form of a table or a formula. The arithmetic controller 7 provides the timing signal to the light source 1 and controls the output timing of light pulses that are output from the light source 1.

Next, the principle of temperature distribution measurement will be now described. Since the light speed in the optical fiber 3 is known, a time function representing the signal intensity of each of Stokes light and anti-Stokes light with a light-emitting time point of the light source 1 as a reference can be converted into a function of the distance along the optical fiber as measured from the light source 1, that is, a distance distribution in which the horizontal axis represents the distance and the vertical axis is the light intensity of Stokes light or anti-Stokes light generated at each position in the optical fiber 3.

On the other hand, each of the anti-Stokes light intensity $I_{as}$ and the Stokes light intensity $I_{st}$ and their ratio $I_{as}/I_{st}$ depend on the temperature of the optical fiber 3. Therefore, the temperature at a position of generation of Raman scattering light can be obtained if an intensity ratio $I_{as}/I_{st}$ becomes known. Since the intensity ratio $I_{as}/I_{st}$ is a function $I_{as}(x)/I_{st}(x)$ of the distance x, a temperature distribution T(x) along the optical fiber 3 can be obtained from the intensity ratio $I_{as}(x)/I_{st}(x)$.

FIG. 9 is a block diagram of an optical fiber temperature distribution measuring device in a related art. Components having the same components in FIG. 8 are given the same reference symbols as the latter.

As shown in FIG. 9, a temperature reference unit 9 having a rolled-up optical fiber of several tens of meters is provided between the optical demultiplexer 2 and the optical fiber 3 (connected to the optical fiber 3 via a connector 13.) The temperature reference unit 9 is provided with a thermometer 10 which has a platinum resistance thermometer sensor, for example, and configured to measure an actual temperature. An output signal of the thermometer 10 is provided to the arithmetic controller 7. A reference thermometer 11 which has a platinum resistance thermometer sensor, for example, and configured to measure an actual temperature is also provided in the vicinity of the optical fiber 3 which is used as a temperature sensor.

With the above configuration, when the temperature of the optical fiber 3 is T (K), the intensity ratio $I_{as}/I_{st}$ between anti-Stokes light and Stokes light is given by the following Equation (1):

$$\frac{I_{as}}{I_{st}} = G_{as} \times \left(\frac{\omega_0 + \omega_r}{\omega_0 - \omega_r}\right)^4 \times \exp\left(-\frac{h\omega_r}{2\pi kT}\right) \quad (1)$$

where
- $G_{as}$: ratio of an anti-Stokes light gain to a Stokes light gain;
- $\omega_0$: angular frequency of an optical signal;
- $\omega_r$: Raman shift angular frequency of the temperature reference unit 9;
- h: Planck constant ($6.626\times10^{-34}$ J·s); and
- k: Boltzmann constant ($1.38\times10^{-23}$ J·K$^{-1}$).

Although the parameter $$L_n = G_{as} \times \left(\frac{\omega_0 + \omega_r}{\omega_0 - \omega_r}\right)^4 \quad (2)$$

Ln is unknown in an actual system, but Ln can be calculated using temperature data of the temperature sensor 10 which is provided in the temperature reference unit 9.

Letting $T_0$ and $G_0(T_0)$ represent the temperature measured by the temperature sensor 10 and the corresponding intensity ratio $I_{as}/I_{st}$, respectively. As shown below, Equation (3) is obtained from Equations (1) and (2).

$$L_n = G_0(T_0) \times \exp\left(\frac{h\omega_r}{2\pi kT_0}\right) \quad (3)$$

Using this value, an equation for calculating a temperature T from an intensity ratio $I_{as}/I_{st}$ between anti-Stokes light AS and Stokes light ST is given by:

$$T = \frac{h\omega_r}{2\pi k} \times \frac{1}{-\log\frac{I_{as}}{I_{st}} + \log L_n} \quad (4)$$

$$= \frac{h\omega_r}{2\pi k} \times \frac{1}{-\log\frac{I_{as}}{I_{st}} + \log G_0(T_0) + \frac{h\omega_r}{2\pi kT_0}}.$$

Actually, an error is caused by a loss occurring at the connecting portion between the device main body and the optical fiber 3 and the difference between a Raman shift angular frequency of the optical fiber 3 and a Raman shift angular frequency used in the calculation. Therefore, a true temperature is measured by the reference thermometer 11 which is disposed in the vicinity of the optical fiber 3, and the Raman shift angular frequency $\omega_r$ used for the temperature calculation is adjusted finely and a temperature T calculated according to Equation (4) is corrected using a coefficient and an offset.

For example, a coefficient correction and an offset correction are used in the following manner:

$$T_r = A \times T + C$$

where
- $T_r$: corrected temperature (K);
- T: temperature (K) before correction;
- A: correction coefficient; and
- C: correction offset.

To eliminate an error that is caused by a loss occurring at the connecting portion and the difference between the Raman shift angular frequency of the optical fiber used in the temperature reference unit 9 and that of the optical fiber 3 used as the sensor, JP-A-2008-249515, for example, proposes a method in which a temperature reference unit to provide a reference for temperature calculation outside the device main body, that is, on the path of the optical fiber for measurement.

However, in the related-art configuration shown in FIG. 9, to perform fitting while adjusting the Raman shift angular frequency finely, it is necessary to repeatedly measure a temperature while finely adjusting the Raman shift angular frequency used for the calculation. Thus, the calibration takes long time.

Even after the fine adjustment of the Raman shift angular frequency, a temperature measurement error occurs due to the difference between the Raman shift angular frequency of the optical fiber used in the temperature reference unit 9 and Raman shift angular frequency of the optical fiber 3 used as the temperature sensor.

Furthermore, a correction that is performed using a coefficient and an offset is a linear correction whereas the relationship between the Raman scattering intensity and the temperature is nonlinear. This causes large errors at temperatures that are much different from the temperature used for the correction.

Still further, where the temperature reference unit for providing a reference for temperature calculation outside the device main body, that is, on the path of the optical fiber for measurement, the total configuration becomes complex. The temperature reference unit needs to be constructed at an installation site of the optical fiber for measurement, resulting in a problem that temperature correction work is complicated.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

Exemplary embodiments provide an optical fiber temperature distribution measuring device which can simplify a temperature correction process and increase the correction accuracy.

According to one or more illustrative aspects of the present invention, there is provided an optical fiber temperature distribution measuring device which measures a temperature distribution along an optical fiber using backward Raman scattering light generated in the optical fiber. The device includes: a reference temperature thermometer disposed in the vicinity of the optical fiber so as to measure a reference temperature of the optical fiber; an arithmetic controller that calculates a temperature of the optical fiber based on the backward Raman scattering light; and a temperature corrector that corrects the calculated temperature based on a correction formula containing the reference temperature as a parameter.

Other aspects and advantages of the present invention will be apparent from the following description, the drawings and the claims.

DETAILED DESCRIPTION OF EXEMPLARY EMBODIMENTS

Figure 1:
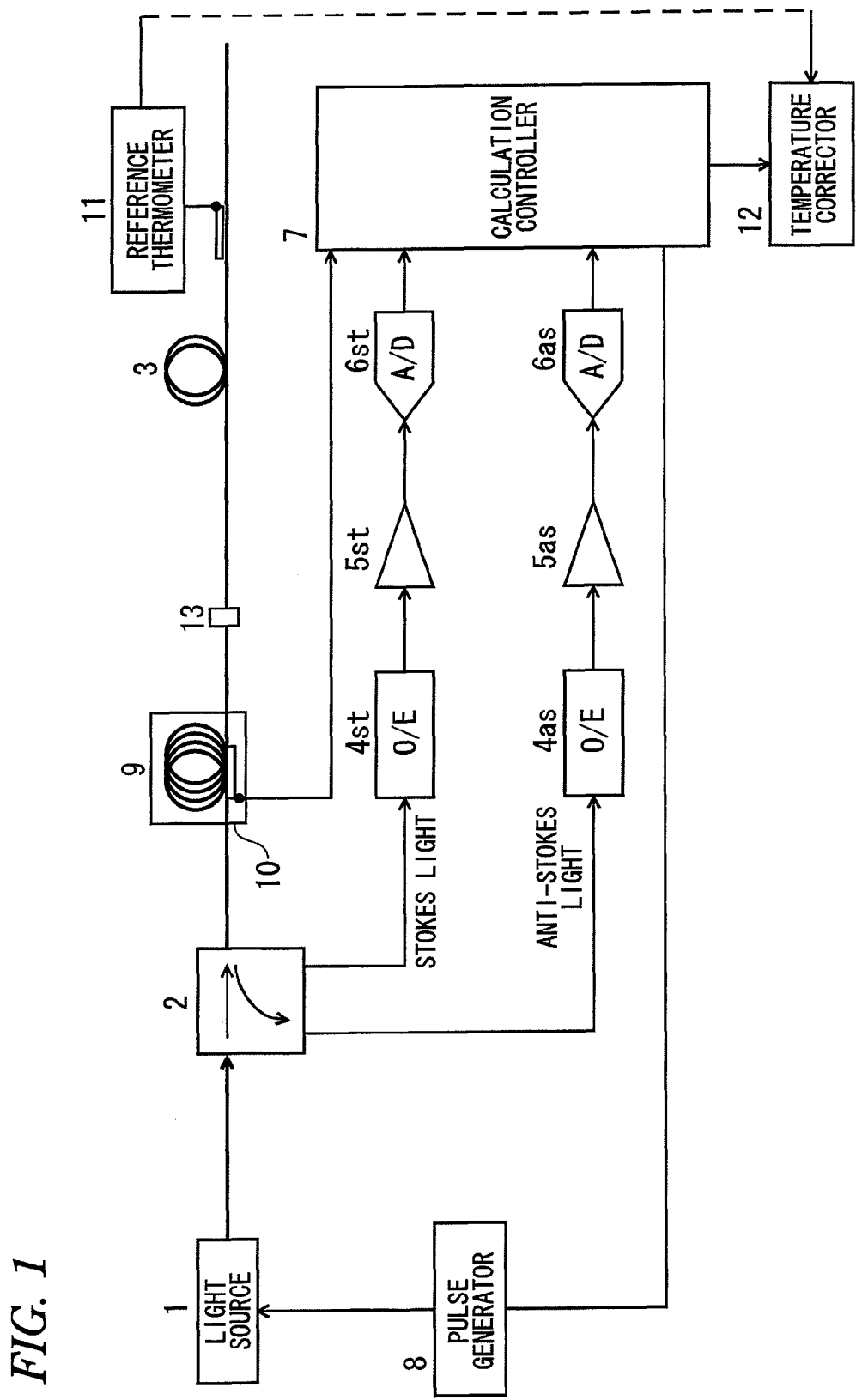
FIG. 1 is a block diagram of an optical fiber temperature distribution measuring device according to an embodiment of the invention.
Figure 9:
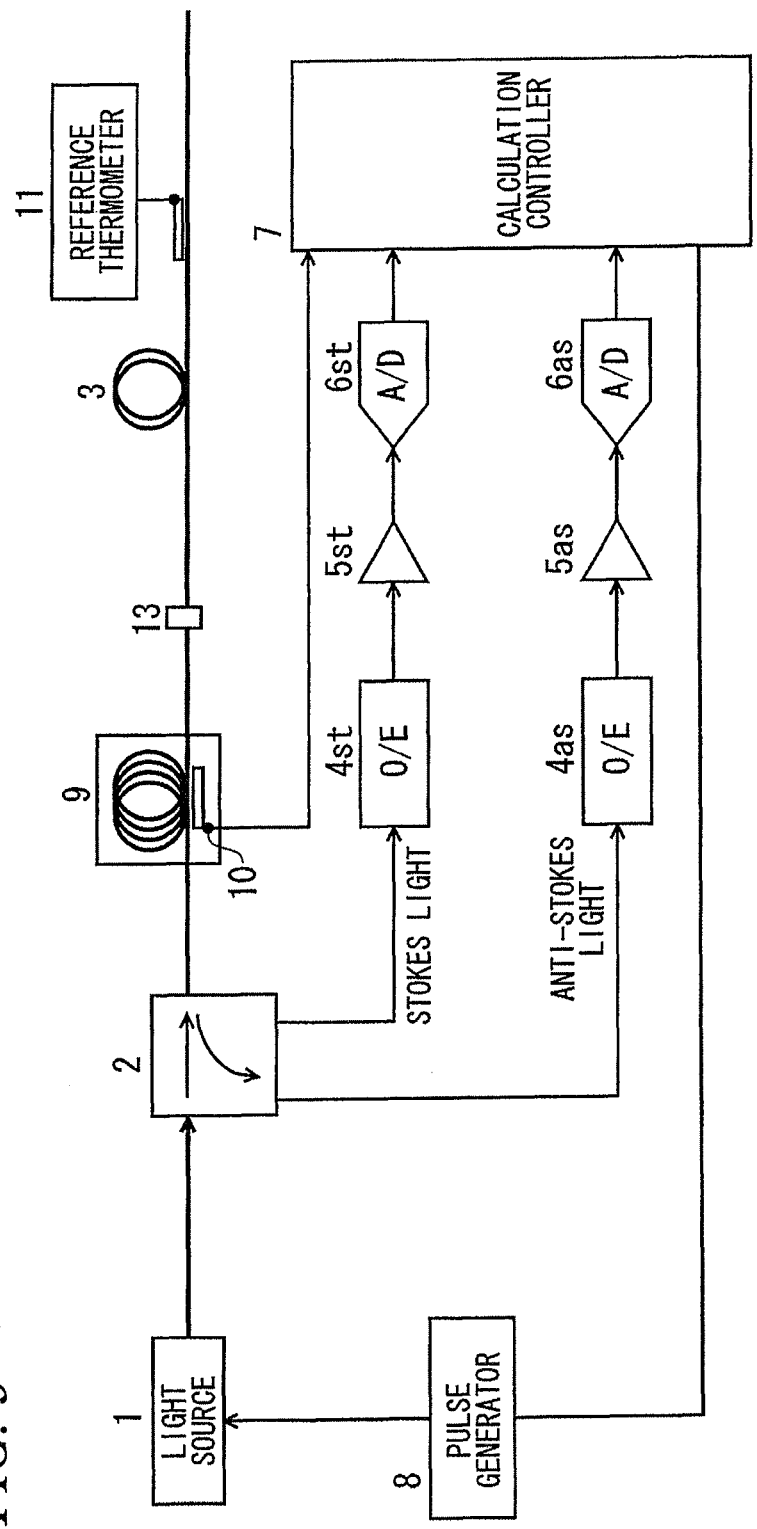
FIG. 9 is a block diagram of an optical fiber temperature distribution measuring device in a related art.

Embodiments of the present invention will be hereinafter described in detail with reference to the drawings. FIG. 1 is a block diagram of an optical fiber temperature distribution measuring device according to an embodiment of the present invention. Components having the same components in FIG. 9 are given the same reference symbols as the latter and redundant descriptions will be avoided. The optical fiber temperature distribution measuring device of FIG. 1 is different from that of FIG. 9 in that in the former a temperature corrector 12 is connected to the arithmetic controller 7.

The temperature corrector 12 corrects a temperature calculated by the arithmetic controller 7 of the device main body using temperature measurement data of the reference thermometer 11 which is disposed in the vicinity of the optical fiber 3 used as the temperature sensor and a correction formula according to the invention, and outputs a highly accurate temperature measurement result.

For details, the temperature corrector 12 corrects the temperature calculated by the arithmetic controller 7 as follows.

First of all, a temperature T is calculated based on Equation (4) using an intensity ratio between anti-Stokes light AS and Stokes light ST and measurement data of the thermometer 10 which is provided in the temperature reference unit 9. Here, the temperature reference unit 9 is incorporated in the device main body.

Next, the temperature T is corrected based on the following correction formula:

$$T_r = \frac{\omega_1}{\frac{\omega_r}{T} - \frac{\omega_r}{T_1'} + \frac{\omega_1}{T_1}} \quad (5)$$

where $\omega_1$ corresponds to the Raman shift angular frequency of the optical fiber 3 used as the temperature sensor and is calculated according to the following Equation (6):

$$\omega_1 = \omega_r \frac{T_2' - T_1'}{T_1' \times T_2'} \times \frac{T_2 \times T_1}{T_2 - T_1} \quad (6)$$

where
$\omega_1$: true Raman shift angular frequency;
$\omega_r$: Raman shift angular frequency of the temperature reference unit 9;

T: temperature (K) before corrected by the temperature corrector 12;
$T_1$, $T_2$: reference temperatures (K) measured by the reference thermometer 11; and
$T_1'$, $T_2'$: temperatures (K) measured before correction when the reference temperature is $T_1$ and $T_2$, respectively.

Equation (6) is used for two-point temperature calibration. If the Raman shift angular frequency of the optical fiber 3 which is used as the temperature sensor is known, it is not necessary to calculate $\omega_1$ according to Equation (6) and one-point calibration can be performed using only $T_1$ and $T_1'$.

The use of Equation (5) makes it unnecessary to perform a fine adjustment of the shift angular frequency, an adjustment using a coefficient and an offset, or determination of parameters by repetitive calculations. Accordingly, the calibration can be performed in a short time with only a small error. The calibration according to Equation (5) will be described below.

As can seen from Equation (1), the intensity ratio between anti-Stokes light AS and Stokes light ST that are output from the device main body which incorporates the temperature reference unit 9 is given by the following Equation (7):

$$\frac{I_{as}}{I_{st}} = G_r(T_0) = L_r \times \exp\left(\frac{-\hbar\omega_r}{2\pi kT_0}\right) \times G_{as} \quad (7)$$

where $G_r(T_0)$: intensity ratio between anti-Stokes light AS and Stokes light ST that are output from the temperature reference unit 9 when the temperature of the temperature reference unit 9 is at $T_0$;
$G_{as}$: ratio of an anti-Stokes light gain to a Stokes light gain;
$\omega_0$: angular frequency of an optical signal; and
$\omega_r$: Raman shift angular frequency of the temperature reference unit 9.

The parameter $L_r$ is given by the following Equation (8):

$$L_n = \left(\frac{\omega_0 + \omega_r}{\omega_0 - \omega_r}\right)^4 \quad (8)$$

On the other hand, a temperature T is calculated by the arithmetic controller 7 from an intensity ratio $I_{as}/I_{st}$ G) between anti-Stokes light AS and Stokes light ST as shown in following Equation (9).

$$T = \frac{\hbar\omega_d}{2\pi k} \times \frac{1}{-\log G + \log G_0(T_0) + \frac{\hbar\omega_d}{2\pi kT_0}} \quad (9)$$

where $\omega_d$ is a Raman shift angular frequency that is used as a temperature calculation parameter in the arithmetic controller 7.

The light intensity ratio $I_{as}/I_{st}$ (=$G_1(T_r)$) when the temperature of the optical fiber 3 which is used as the temperature sensor is $T_r$ is given by the following Equation (10):

$$G_1(T_r) = L_1 \times \exp\left(\frac{-\hbar\omega_1}{2\pi kT_r}\right) \times G_{as} \times \Delta G_c \quad (10)$$

The parameter $L_1$ in Equation (10) is given by the following Equation (11):

$$L_1 = \left(\frac{\omega_0 + \omega_1}{\omega_0 - \omega_1}\right)^4 \quad (11)$$

where $\omega_1$: True Raman shift angular frequency of the optical fiber 3 which is used as the temperature sensor; and $\Delta G_c$: difference between losses for anti-Stokes light AS and Stokes light ST of the connector 13 which connects the device main body and the optical fiber 3.

From Equations (9) and (10), as shown in following Equation (11), temperature T is calculated by the arithmetic controller 7 when the temperature of the optical fiber 3 is $T_r$:

$$T = \frac{\hbar\omega_d}{2\pi k} \times \frac{1}{-\log G_1(T_r) + \log G_r(T_0) + \frac{\hbar\omega_d}{2\pi k T_0}} \quad (12)$$

$$= \frac{\hbar\omega_d}{2\pi k} \times \frac{1}{-\log L_1 - \log G_{as} - \log\Delta G_c + \frac{\hbar\omega_1}{2\pi k T_r} + \log L_r + \log G_{as} - \frac{\hbar\omega_r}{2\pi k T_0} + \frac{\hbar\omega_d}{2\pi k T_0}}$$

$$= \frac{\hbar\omega_d}{2\pi k} \times \frac{1}{-\log L_1 - \log\Delta G_c + \frac{\hbar\omega_1}{2\pi k T_r} + \log L_r - \frac{\hbar}{2\pi k T_0}(\omega_r - \omega_d)}$$

As can be seen from Equation (12), if the shift angular frequency $\omega_r$ inside the main body and the shift angular frequency $\omega_d$ used for the calculation are the same, the term involving $T_0$ on the right side disappears, and thus the temperature T calculated using the optical fiber 3 which is used as the temperature sensor does not depend on the temperature of the main body. Accordingly, to prevent the measured temperature from varying in response to the variation in the temperature of the main body, it is necessary to use a true shift angular frequency of the optical fiber used in the temperature reference unit 9 which is disposed in the device main body.

The temperature calibration of the optical fiber 3 which is used as the temperature sensor will be described with assumptions that the shift angular frequency of the optical fiber used in the temperature reference unit 9 is known and equal to the shift angular frequency used for the temperature calculation.

Assuming $\omega_d = \omega_r$ in Equation (12), the measured temperature T is expressed as follows:

$$T = \frac{\hbar\omega_r}{2\pi k} \times \frac{1}{-\log L_1 + \log L_r - \log\Delta G_c + \frac{\hbar\omega_1}{2\pi k T_r}} \quad (13)$$

The Raman shift angular frequency $\omega_1$ of the optical fiber 3 can be corrected according to Equation (6) using two reference temperatures $T_1$ and $T_2$ measured at the same position by the reference thermometer 11 and values $T_1'$ and $T_2'$ calculated by the arithmetic controller 7.

A first temperature is calculated based on the following Equation (14):

$$T = \frac{\hbar\omega_r}{2\pi k} \times \frac{1}{-\log G_1(T_r) + \log G_r(T_0) + \frac{\hbar\omega_r}{2\pi k T_0}} \quad (14)$$

where $T_r$: actual temperature (measured by the reference thermometer 11);

$G_1(T_r)$: intensity ratio between anti-Stokes light AS and Stokes light ST measured using the optical fiber 3 (at the temperature Tr);

$G_r(T_0)$: intensity ratio between anti-Stokes light AS and Stokes light ST measured using the optical fiber of the temperature reference unit 9 (at the reference temperature $T_0$); and $\omega_r$: Raman shift angular frequency used for the temperature calculation (Raman shift angular frequency of the temperature reference unit 9).

By substituting Equations (7) and (10) into Equation (14), the following Equation (15) is obtained:

$$T = \frac{\hbar\omega_r}{2\pi k} \times \frac{1}{-\log L_1 + \frac{\hbar\omega_1}{2\pi k T_r} - \log\Delta G_c + \log L_r - \frac{\hbar\omega_r}{2\pi k T_0} + \frac{\hbar\omega_r}{2\pi k T_0}} \quad (15)$$

$$= \frac{\hbar\omega_r}{2\pi k} \times \frac{1}{-\log L_1 + \log L_r - \log\Delta G_c + \frac{\hbar\omega_1}{2\pi k T_r}}$$

By solving Equation (15) for $T_r$, the following Equation (16) is obtained:

$$T_1 = \frac{\hbar\omega_1}{2\pi k} \times \frac{1}{\frac{\hbar\omega_r}{2\pi k T} + \log L_1 - \log L_r + \log\Delta G_c} \quad (16)$$

According to Equation (16), the true temperature Tr is calculated from the temperature T calculated by the arithmetic controller 7. The parameter $X = -\log L_1 + \log L_r - \log\Delta G_c$ can be calculated based on temperature measurement data of the reference thermometer 11 which is disposed in the vicinity of the optical fiber 3.

By rewriting Equation (13), the relationship between the actual temperature $T_r$ of the optical fiber 3 and the temperature T calculated by the arithmetic controller 7 is given by the following Equation (17):

$$T = \frac{\hbar\omega_r}{2\pi k} \times \frac{1}{X + \frac{\hbar\omega_1}{2\pi k T_r}} \quad (17)$$

If the reference temperature $T_1$ measured by the reference thermometer 11 is known and the corresponding temperature calculation value is $T_1'$, X is calculated from Equation (17) as follows:

$$X = \frac{h\omega_r}{2\pi k T_1'} - \frac{h\omega_1}{2\pi k T_1} \quad (18)$$

By combining Equations (16) and (18), Equation (5) (temperature calibration formula) can be derived as follows as Equation (19):

$$T_1 = \frac{h\omega_1}{2\pi k} \times \frac{1}{\frac{h\omega_r}{2\pi k T} - X}$$

$$= \frac{h\omega_1}{2\pi k} \times \frac{1}{\frac{h\omega_r}{2\pi k T} - \frac{h\omega_r}{2\pi k T_1'} + \frac{h\omega_1}{2\pi k T_1}}$$

$$= \frac{\omega_1}{\frac{\omega_r}{T} - \frac{\omega_r}{T_1'} + \frac{\omega_1}{T_1}} \quad (19)$$

where

T: temperature (K) before correction calculated by the arithmetic controller 7;

$T_1$: reference temperature (K) measured by the reference thermometer 11;

$T_1'$: temperature (K) measured before correction when the reference temperature is $T_1$ $\omega_1$: true Raman shift angular frequency of the optical fiber 3; and $\omega_r$: Raman shift angular frequency of the temperature reference unit 9.

The above process of deriving Equation (19) for temperature correction clearly shows that the corrected temperature Tr is irrelevant to the difference $\Delta G_c$ between the losses for anti-Stokes light AS and Stokes light ST. This means that the influence of the losses occurring at the connecting portion between the device main body and the optical fiber 3 which is used as the temperature sensor is also corrected.

Equation (19) is basically for one-point temperature calibration and is applicable to the case that the Raman shift angular frequency $\omega_1$ of the optical fiber 3 which is used as the sensor is known. Where the Raman shift angular frequency $\omega_1$ is unknown, $\omega_1$ can be calculated by two-point temperature calibration according to Equation (6) (described below).

The following Equation (20) is obtained from Equation (1):

$$\frac{h\omega_r}{2\pi k T} = -\log\frac{I_{as}}{I_{st}} + \log\left\{G_{as} \times \left(\frac{\omega_0 + \omega_r}{\omega_0 - \omega_r}\right)^4\right\} \quad (20)$$

Assuming the true Raman shift angular frequency $\omega_1$ of the optical fiber 3 which is used as the temperature sensor is equal to $\omega_1$ and a temperature $T_1'$ has been measured (calculated) before correction with the true temperature $T_1$, Equation (21) is given as follows:

$$\frac{h\omega_r}{2\pi k T_1'} = -\log\frac{I_{as}}{I_{st}} + \log\left\{G_{as} \times \left(\frac{\omega_0 + \omega_r}{\omega_0 - \omega_r}\right)^4\right\}$$

$$= \frac{h\omega_1}{2\pi k T_1} - \log\left\{G_{as} \times \left(\frac{\omega_0 + \omega_1}{\omega_0 - \omega_1}\right)^4\right\} + \log\left\{G_{as} \times \left(\frac{\omega_0 + \omega_r}{\omega_0 - \omega_r}\right)^4\right\} \quad (21)$$

Assuming the true Raman shift angular frequency $\omega_1$ of the optical fiber 3 which is used as the temperature sensor is equal to $\omega_1$ and a temperature $T_2'$ has been measured (calculated) before correction with the true temperature $T_2$, Equation (22) is given as follows:

$$\frac{h\omega_r}{2\pi k T_2'} = \frac{h\omega_1}{2\pi k T_2} - \log\left\{G_{as} \times \left(\frac{\omega_0 + \omega_1}{\omega_0 - \omega_1}\right)^4\right\} + \log\left\{G_{as} \times \left(\frac{\omega_0 + \omega_r}{\omega_0 - \omega_r}\right)^4\right\} \quad (22)$$

The following Equation (23) is obtained by subtracting Equation (22) from Equation (21):

$$\frac{h\omega_r}{2\pi k}\left(\frac{1}{T_1'} - \frac{1}{T_2'}\right) = \frac{h\omega_1}{2\pi k}\left(\frac{1}{T_1} - \frac{1}{T_2}\right) \quad (23)$$

The following Equation (24) which is the same as Equation (6) is obtained from Equation (23):

$$\omega_1 = \omega_r \times \frac{T_2' - T_1'}{T_1' \times T_2'} \times \frac{T_2 \times T_1}{T_2 - T_1} \quad (24)$$

where $\omega_1$: true Raman shift angular frequency of the optical fiber 3;

$\omega_r$: Raman shift angular frequency of the temperature reference unit 9;

T: temperature (K) before correction calculated by the instrument;

$T_1$, $T_2$: reference temperatures (K) measured by the reference thermometer 11; and $T_1'$, $T_2'$: temperatures (K) calculated before correction when the reference temperature is $T_1$ and $T_2$, respectively.

Figure 2:
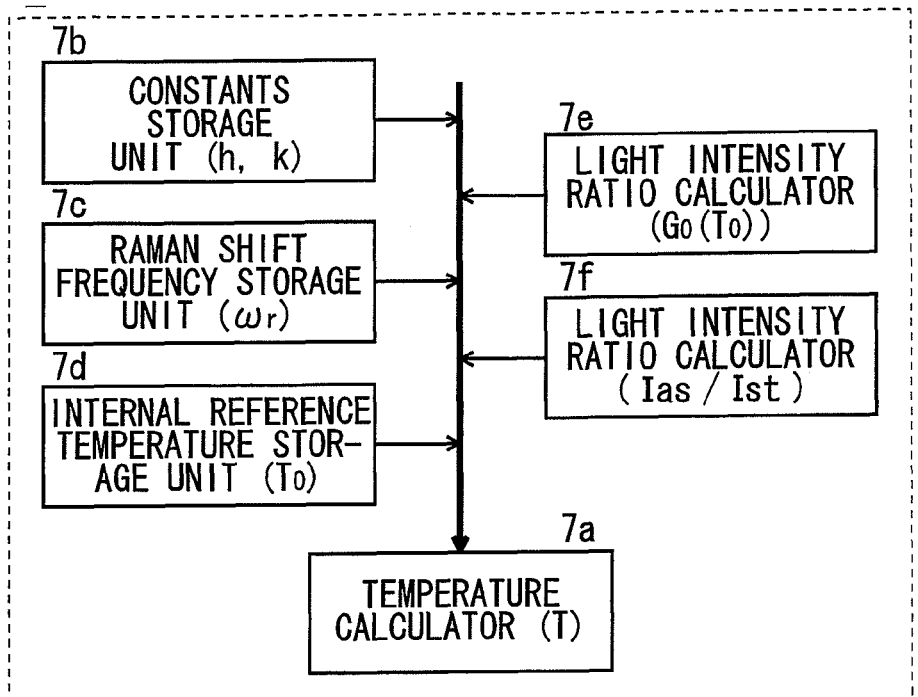
FIG. 2 is a block diagram of specific examples of a arithmetic controller and a temperature corrector.
Figure 2:
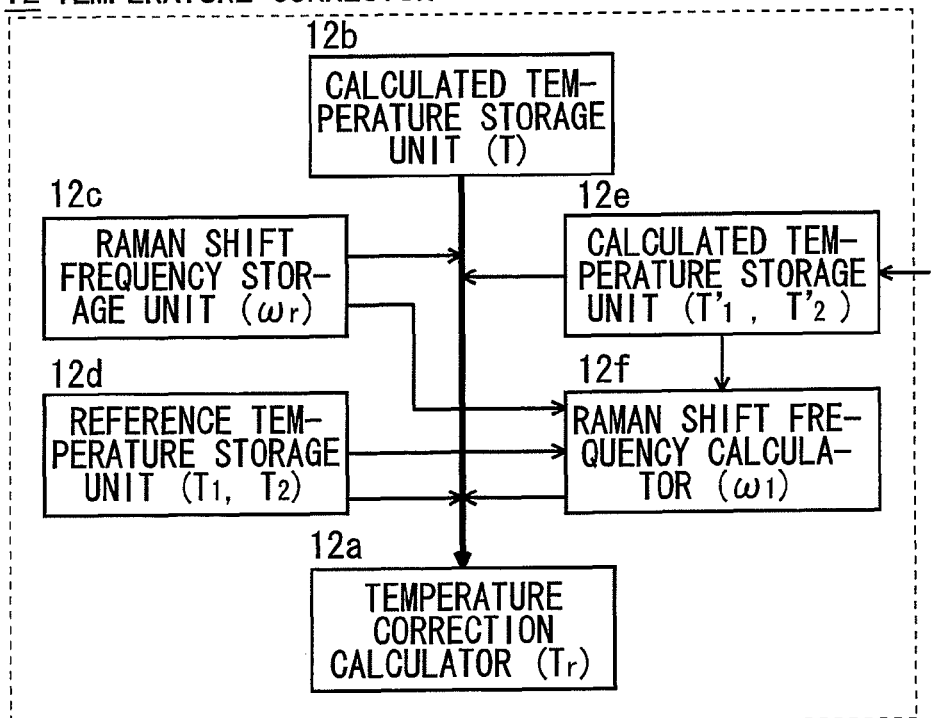

FIG. 2 is a block diagram of specific examples of the arithmetic controller 7 and the temperature corrector 12.

The arithmetic controller 7 includes a temperature calculator 7a (main section) for calculating a temperature according to Equation (4), a constants storage unit 7b which is stored with the Planck constant h and the Boltzmann constant k, a Raman shift frequency storage unit 7c for storing a Raman shift angular frequency $\omega_r$ of the temperature reference unit 9 which is disposed inside the device, an internal reference temperature storage unit 7d for storing a measured temperature $T_o$ of the temperature reference unit 9, a light intensity ratio calculator 7e for calculating a light intensity ratio $G_0(T_0)$ in the temperature reference unit 9, a light intensity ratio calculator 7f for calculating a light intensity ratio $I_{as}/I_{st}$ of the optical fiber 3 which is used as the temperature sensor, etc.

The temperature corrector 12 includes a temperature correction calculator 12a (main section) for performing a temperature correcting calculation according to Equations (5) or (19), a calculated temperature storage unit 12b for storing a temperature T calculated by the temperature calculator 7a of the arithmetic controller 7, a Raman shift frequency storage unit 12c for storing a Raman shift angular frequency $\omega_r$ of the temperature reference unit 9 which is disposed inside the device, a reference temperature storage unit 12d for storing reference temperatures $T_1$ and $T_2$ measured by the reference thermometer 11 which is disposed in the vicinity of the optical fiber 3 which is used as the temperature sensor, a calculated temperatures storage unit 12e for storing temperatures $T_1'$ and $T_2'$ measured before correction when the reference temperature is $T_1$ and $T_2$, respectively, a Raman shift frequency calculator 12*f* for calculating a Raman shift angular frequency $\omega_1$ of the optical fiber 3, etc.

Figure 3:
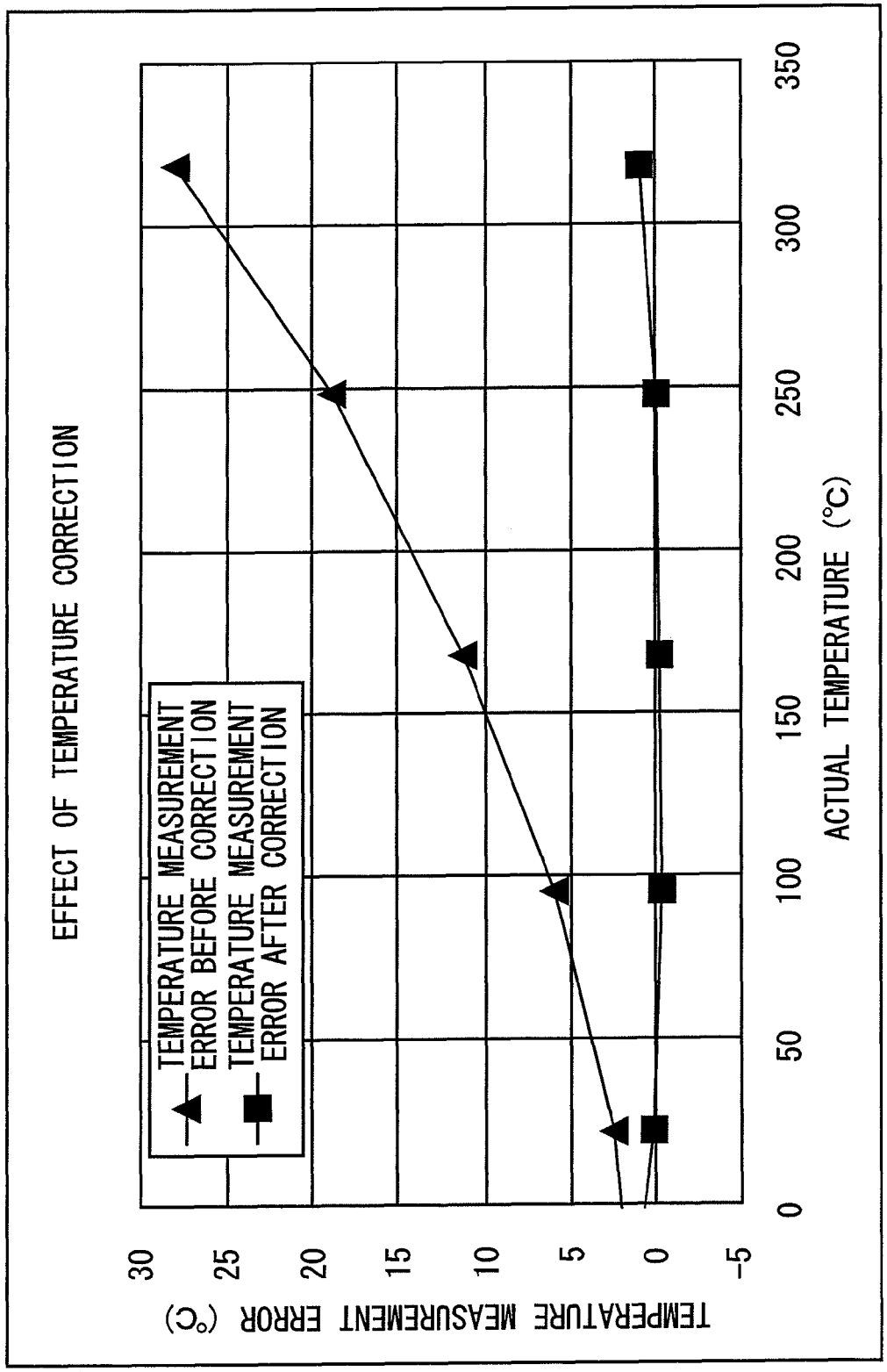
FIG. 3 is a graph showing an example effect of a temperature correction using the correction formula according to the embodiment.

FIG. 3 is a graph showing an example effect of a temperature correction using the correction formula. Parameter values in the correction formula are as follows:

Raman shift angular frequency $\omega_r$ used for temperature calculation before correction: $72.4 \times 10^{12}$ rad/Hz Actual temperatures $T_1$, $T_2$: 295.85 K (22.7° C.), 521.25 K (248.1° C.)

Calculated temperatures $T_1'$, $T_2'$ before temperature correction: 298.15 K (25.0° C.), 540.25 K (267.1° C.)

Temperature measurement errors before the correction are large, for example, about 6° C. and about 19° C. when the actual temperature is 100° C. and 250° C., respectively. This is considered due to connection loss of the device main body and the optical fiber 3 and the difference between the Raman shift angular frequency of the optical fiber and the Raman shift angular frequency of the optical fiber 3. In contrast, temperature measurement errors after the correction using the correction formula are very small, for example, smaller than −0.1° C. and about 0° C. when the actual temperature is 100° C. and 250° C., respectively.

In the above-described embodiment, the reference thermometer 11 is disposed in the vicinity of the optical fiber 3 and its temperature measurement data are acquired offline and used as calculation parameters in the arithmetic controller 7. However, where the connection loss of the device main body and the optical fiber 3 varies, data of the reference thermometer 11 may be taken in real time (indicated by the solid line in FIG. 4) so that the parameters in the temperature calculation formula are varied in real time.

In actual service, there may be a case that the reference thermometer 11 cannot be disposed in the vicinity of the optical fiber 3. Even in such a case, it is necessary to determine reference temperatures by a certain method. In an actual system, the difference between losses of Stokes wavelength light and anti-Stokes wavelength light in the sensor optical fiber 3 mainly causes a temperature measurement error. It is necessary to determine reference temperatures by removing this above difference.

To eliminate such an error, JP-A-2004-69685, for example, describes that two separate light sources are provided for the Stokes wavelength and the anti-Stokes wavelength in addition to a DTS optoelectronics module and a temperature correction is calculated by measuring losses of Stokes wavelength light and anti-Stokes wavelength light by determining Rayleigh scattering intensities at the respective wavelengths. However, this method requires the three light sources and thus the system becomes expensive.

Figure 4:
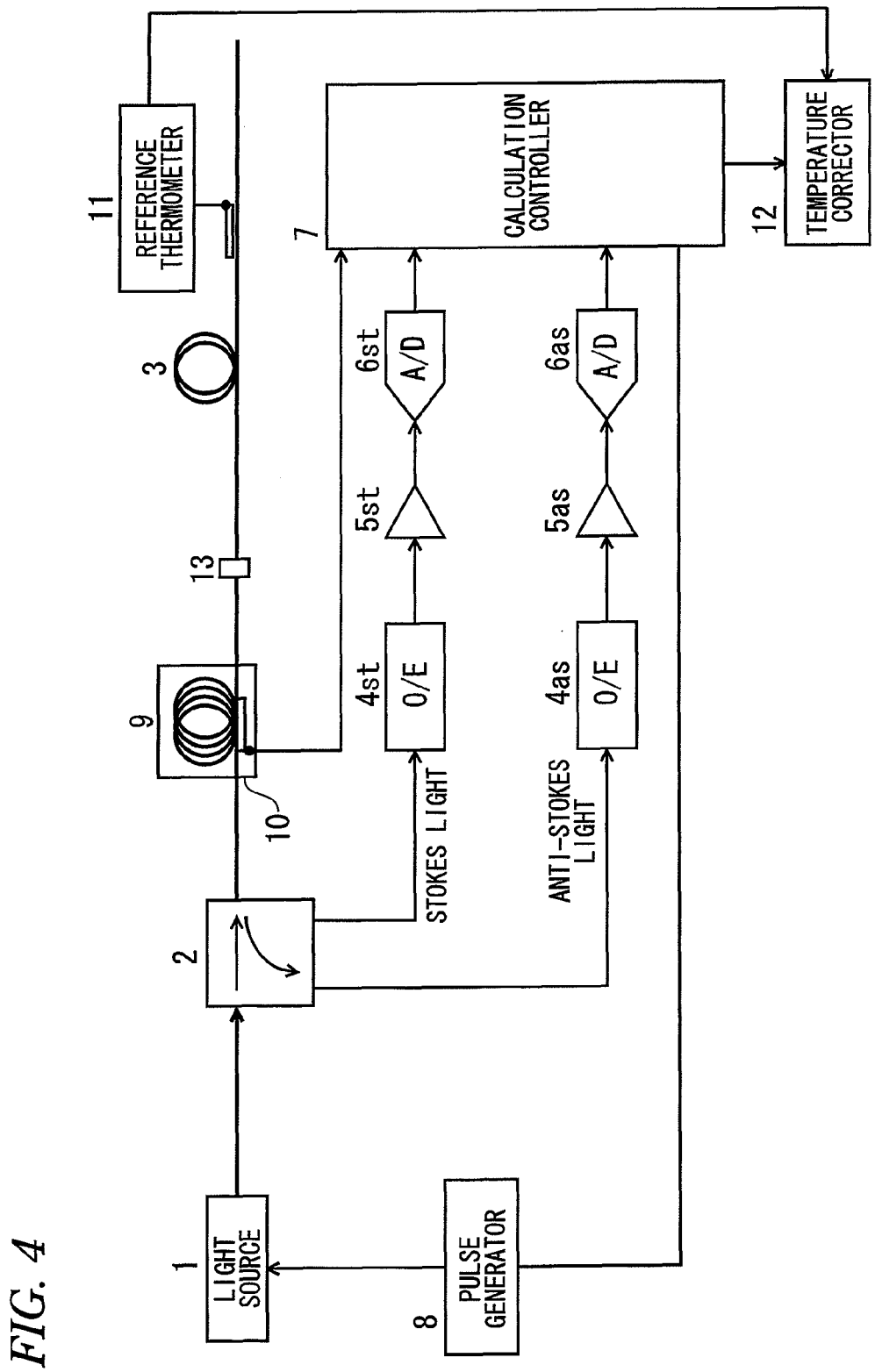
FIG. 4 is a block diagram showing another embodiment of the invention.
Figure 5:
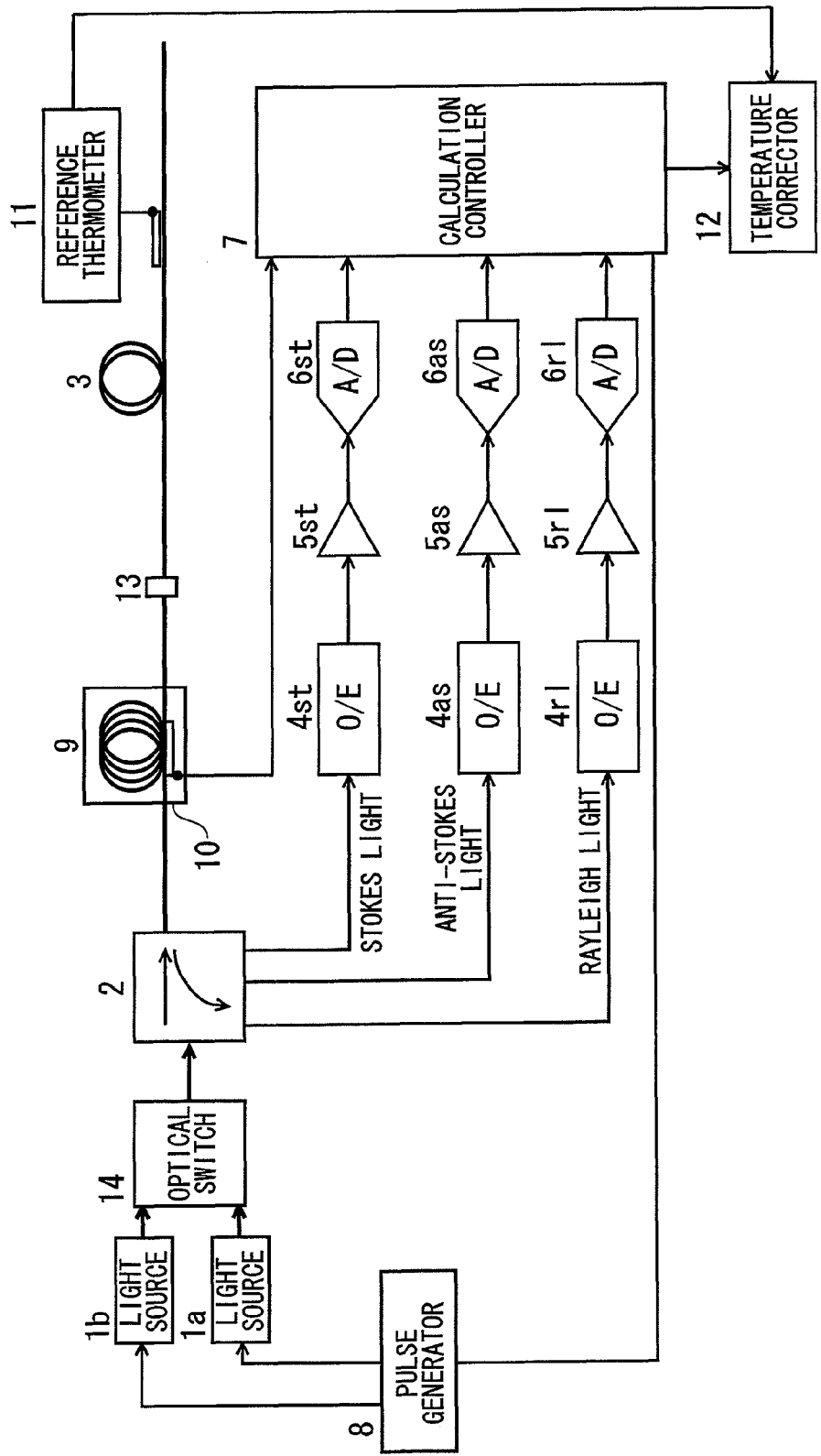
FIG. 5 is a block diagram showing another embodiment of the invention.

In contrast, a configuration shown in FIG. 5 makes it possible to correct an error due to the difference between losses of Stokes wavelength light and anti-Stokes wavelength light relatively inexpensively. FIG. 5 is a block diagram of an optical fiber temperature distribution measuring device according to another embodiment of the invention. Components having the same components shown in FIG. 1 or 4 are given the same reference symbols.

As shown in FIG. 5, two light sources 1*a* and *b* and an optical switch 14 are provided in place of the light source 1 shown in FIGS. 1 and 4. The light source 1*a* is used for calculating a temperature using an intensity ratio between Stokes light and anti-Stokes light like the light source 1 shown in FIGS. 1 and 4. The light source 1*b* is an anti-Stokes wavelength light source for measuring Rayleigh scattering light at the anti-Stokes wavelength. The optical switch 14 switches between output light beams of the light sources 1*a* and 1*b* and provides the resulting light to the optical demultiplexer 2.

The optical demultiplexer 2 is provided with three output ports. A first output port, a second output port, and a third output port are connected to the O/E converter 4*st*, the O/E converter 4*as*, and an O/E converter 4*r*1, respectively.

The output terminal of the O/E converter 4*st* is connected to the arithmetic controller 7 via the amplifier 5*st* and the A/D converter 6*st*. The output terminal of the O/E converter 4 as is connected to the arithmetic controller 7 via the amplifier 5 as and the A/D converter 6*as*. The output terminal of the O/E converter 4*r*1 is connected to the arithmetic controller 7 via the amplifier 5*r*1 and the A/D converter 6*r*1. The arithmetic controller 7 is connected to the light sources 1*a* and 1*b* via the pulse generator 8. The O/E converter 4*r*1, the amplifier 5*r*1, and the A/D converter 6*r*1 are provided to measure Rayleigh scattering light that is included in light emitted from the light source 1*a*.

A description will be made of a method for correcting an error due to the difference between losses of Stokes wavelength light and anti-Stokes wavelength light in the configuration of FIG. 5. An anti-Stokes light intensity corresponding to a detection position x of the photo detector when the temperature at the position x is T (K) is given by the following Equation (25):

$$I_{as}(x, T) = G_{as} \times P_0 \times L_{ld}(x) \times L_{as}(x) \times \left(\frac{\omega_0 + \omega_r}{\omega_0 - \omega_r}\right)^4 \times \frac{1}{\exp\left(\frac{\hbar\omega_r}{2\pi kT}\right) - 1} \quad (25)$$

where
$G_{as}$: anti-Stokes light gain;
$P_0$: optical power of the light source 1*a* when an anti-Stokes light is measured;
$L_{ld}(x)$: one-way loss to the position x of light emitted from the light source 1*a*;
$L_{as}(x)$: one-way loss from the position x to the photo detector of anti-Stokes light;
$\omega_0$: angular frequency of light emitted from the light source 1*a*;
$\omega_r$: Raman shift angular frequency;
h: Planck constant ($6.624 \times 10^{-34}$ J·s);
k: Boltzmann constant ($1.38 \times 10^{-23}$ J·K$^{-1}$); and
T: absolute temperature (K).

On the other hand, a Rayleigh scattering light intensity $L_{rld}$ when the light source 1*a* is used is given by the following Equation (26):

$$I_{rld}(x) = P_{ld} \times G_{rld} \times L_{ld}(x) \times L_{ld}(x) \quad (26)$$

A Rayleigh scattering light intensity $I_{ras}$ when the anti-Stokes wavelength light source 1*b* is used is given by the following Equation (27):

$$I_{ras}(x) = P_{as} \times G_{ras} \times L_{as}(x) \times L_{as}(x) \quad (27)$$

G(x, T), which is defined as Equation (25) divided by the square root of the product of Equations (26) and (27), is given by the following Equation (28):

$$G(x, T) = \frac{I_{as}(x, T)}{\sqrt{I_{rld}(x) \times I_{ras}(x)}} \quad (28)$$

$$= \frac{G_{as} \times P_0}{\sqrt{P_{ld} \times G_{rld} \times P_{as} \times G_{ras}}} \times \left(\frac{\omega_0 + \omega_r}{\omega_0 - \omega_r}\right)^4 \times \frac{1}{\exp\left(\frac{\hbar\omega_r}{2\pi kT}\right) - 1}$$

That is, the anti-Stokes light intensity divided by the square root of the product of the Rayleigh light intensities measured at the anti-Stokes wavelength and the wavelength of the light source 1a is not affected by the losses occurring at the anti-Stokes wavelength and the Rayleigh wavelength. In this manner, a temperature that is not affected by losses occurring at the anti-Stokes wavelength and the Rayleigh wavelength can be calculated.

A parameter $G_0$ is defined as follows:

$$G_0 = \frac{G_{as} \times P_0}{\sqrt{P_{ld} \times G_{rid} \times P_{as} \times G_{ras}}} \quad (29)$$

As can be seen from Equation (28), $G_0$ of Equation (29) can be calculated as follows by using a value $G(x_{ref}, T_{ref})$ that is obtained when a temperature reference unit (located at a position $x_{ref}$) shows a known temperature $T_{ref}$:

$$G_0 = G(x_{ref}, T_{ref}) \times \left(\frac{\omega_0 - \omega_{ref}}{\omega_0 + \omega_{ref}}\right)^4 \times \left(\exp\left(\frac{\hbar \omega_{ref}}{2\pi k T_{ref}}\right) - 1\right) \quad (30)$$

where $\omega_{ref}$ is the Raman shift angular frequency of the temperature reference portion.

From Equations (28) and (29), the temperature T(x) is expressed as follows using G(x, T):

$$T(x) = \frac{\hbar \omega_r}{2\pi k} \times \log \frac{1}{\left\{\frac{G_0}{G(x,T)} \times \left(\frac{\omega_0 - \omega_r}{\omega_0 - \omega_r}\right)^4 + 1\right\}} \quad (31)$$

Equation (31) shows that a correct temperature that is not affected by fiber losses can be measured by using G(x, T) which is obtained by dividing an anti-Stokes light intensity by the square root of the product of Rayleigh light intensities measured at the anti-Stokes wavelength and the wavelength of the light source 1a.

Although the above temperature measurement takes a relatively long time because two kinds of Rayleigh scattering light and one kind of Raman scattering light are measured with high accuracy, in actual, it is adequate that the above temperature measurement be performed only in calibrating the device. A target temperature can be obtained by correcting a temperature that is measured ordinarily using the ratio between an anti-Stokes light intensity and a Stokes light intensity and using, as a reference temperature, the temperature obtained by the calibration.

As a result, a more accurate temperature measurement can be performed even in the case where losses of anti-Stokes light and Stokes light are varied due to deterioration of the optical fiber 3. Further, in this case, the above measurement can be implemented at a relatively low cost.

In the above embodiment, a positive temperature as a reference of correction is measured using Rayleigh light and anti-Stokes light. A positive temperature as a reference of correction can also be measured using Rayleigh light and Stokes light in a similar manner.

Figure 6:
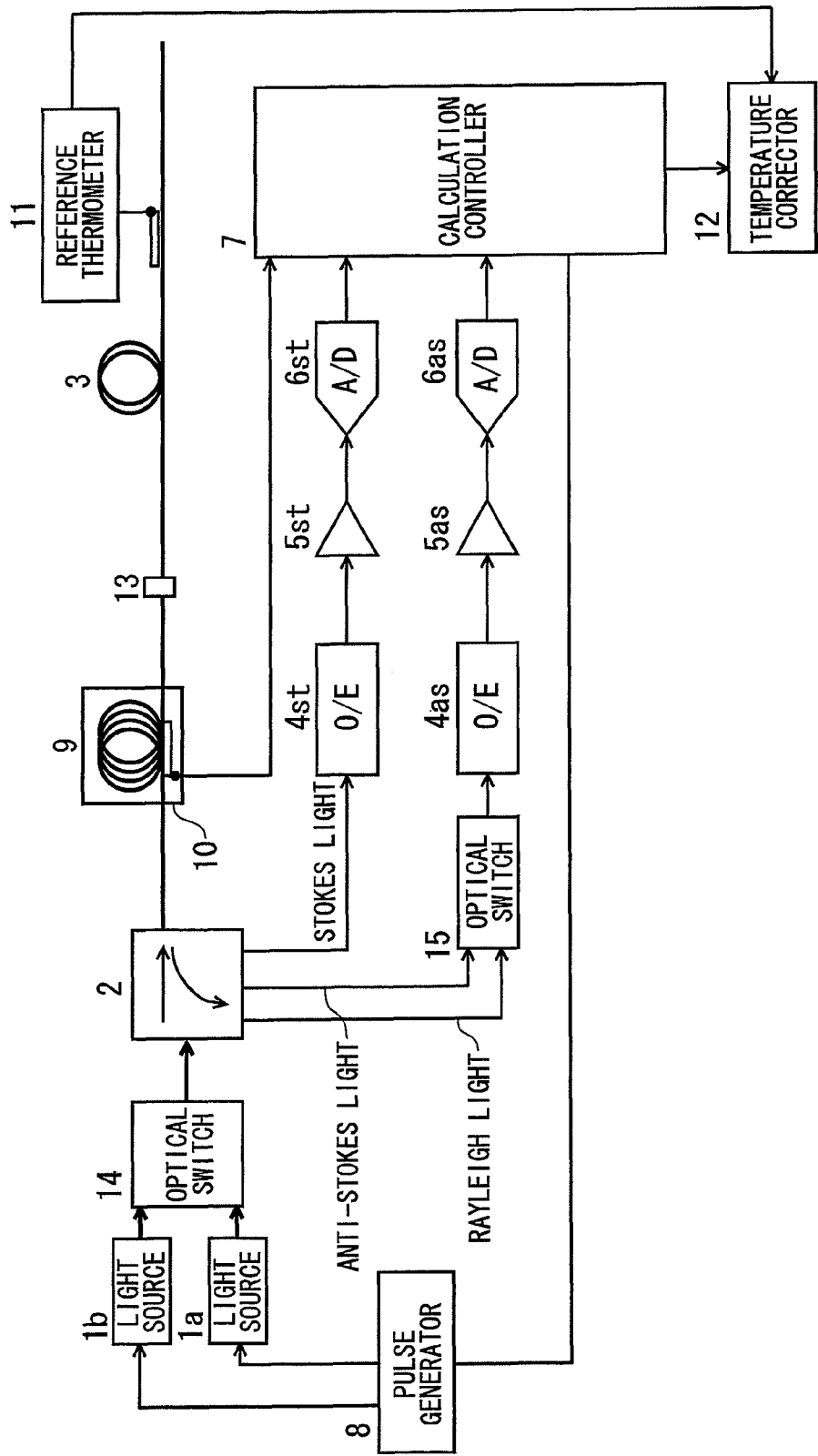
FIG. 6 is a block diagram showing another embodiment of the invention.
Figure 7:
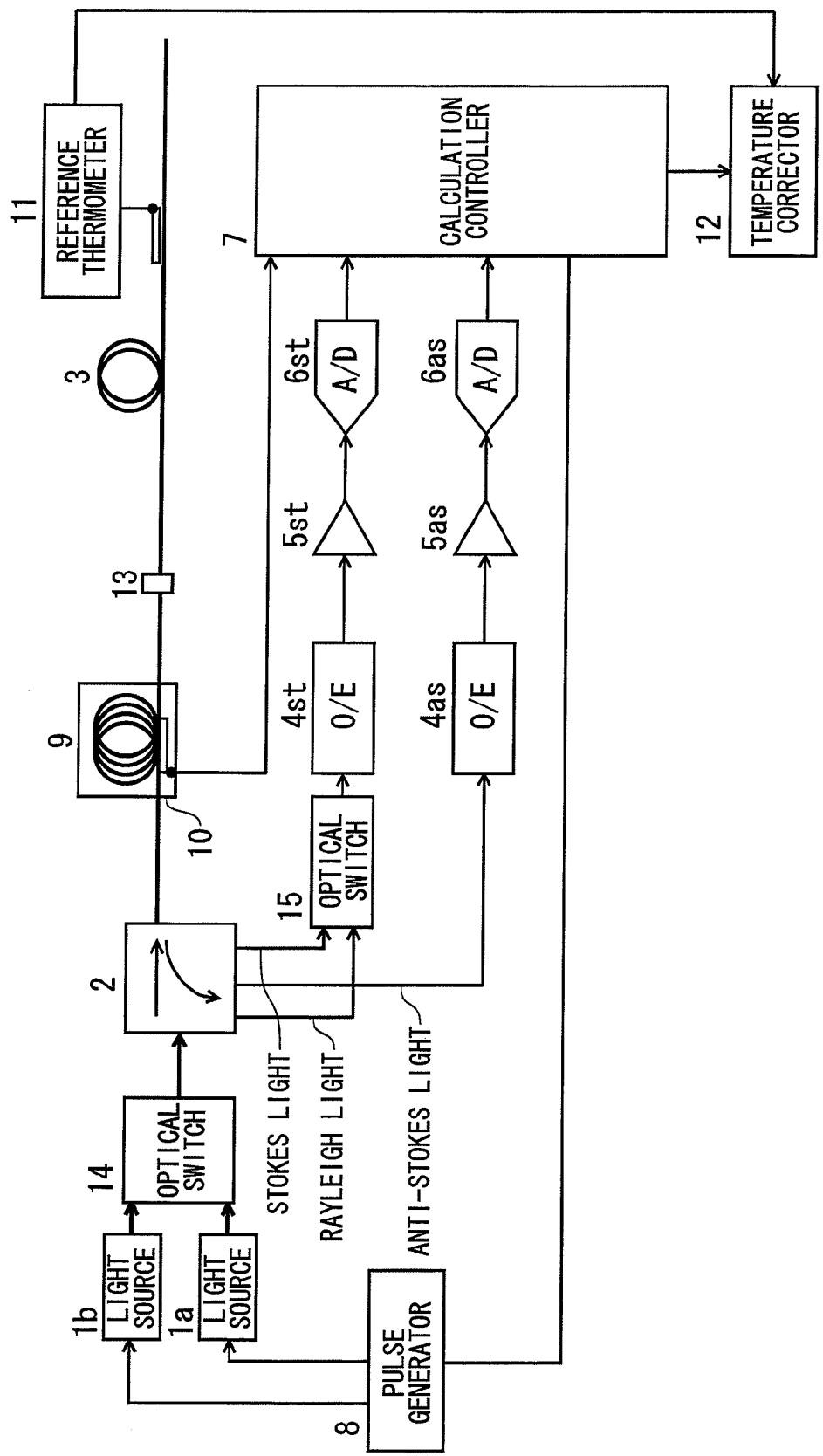
FIG. 7 is a block diagram showing another embodiment of the invention.
Figure 8:
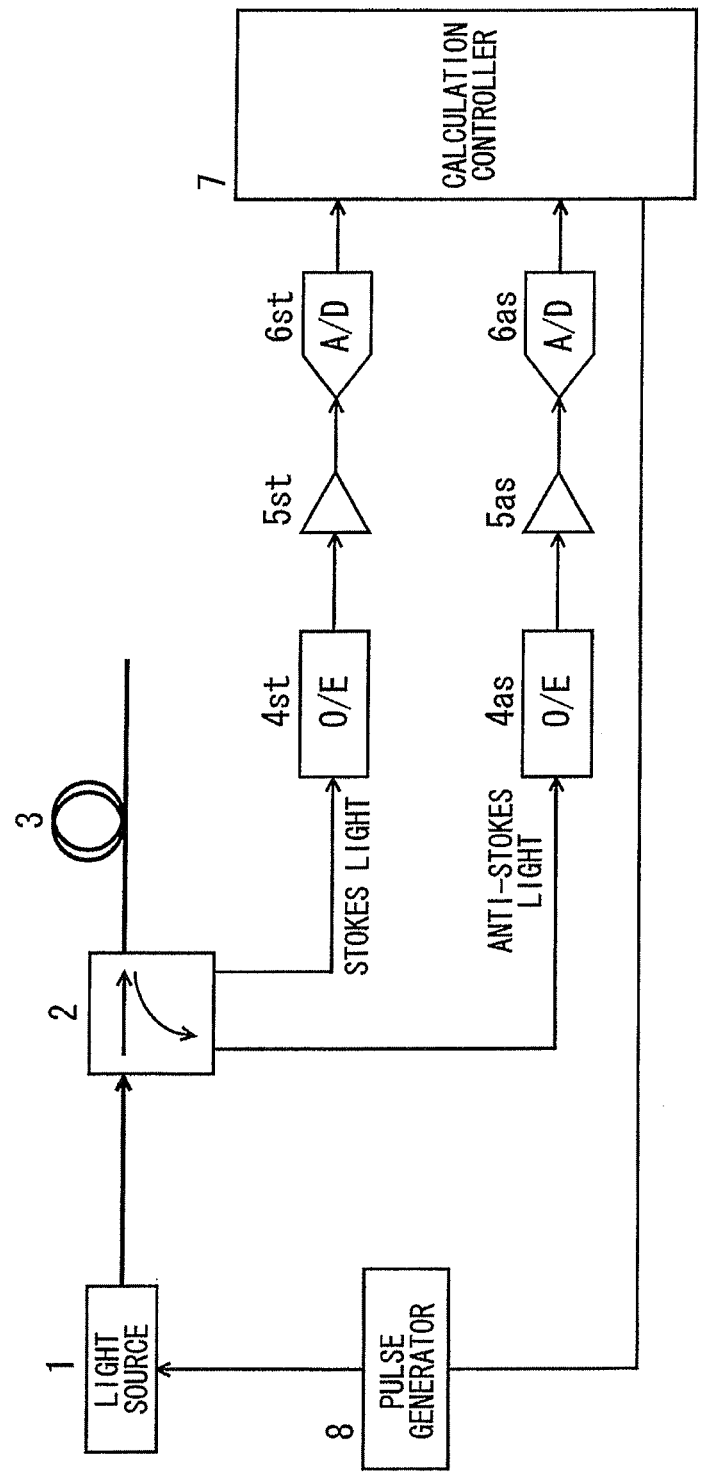
FIG. 8 is a block diagram showing the configuration of an example basic optical fiber temperature distribution measuring device.

In the above embodiment, the Rayleigh light measuring circuit is provided separately. FIGS. 6 and 7 show other embodiments which employ an optical switch 15. The optical switch 15 provides Rayleigh light, instead of anti-Stokes light or Stokes light, to the anti-Stokes light measuring circuit or the Stokes light measuring circuit. The anti-Stokes light measuring circuit or the Stokes light measuring circuit is used as a Rayleigh light measuring circuit.

As described above, a temperature is determined by a correction according to the temperature correction formula using a temperature(s) of the reference thermometer or the temperature reference portion as a parameter(s). Therefore, the calibration work is simplified and can be performed in a short time.

Since a correction is performed according to the correction formula that is derived from the formula of principle, a highly accurate calibration can be realized without an error as occurs in the case of linear approximation. As such, the present embodiment is suitably applied to temperature distribution measurement, detection of a failure, etc. which use an optical fiber as a sensor.

Furthermore, a more accurate temperature measurement can be performed even in the case where losses of anti-Stokes light and Stokes light are varied due to deterioration of the optical fiber.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. An optical fiber temperature distribution measuring device which measures a temperature distribution along an optical fiber using backward Raman scattering light generated in the optical fiber, the device comprising:
   a reference temperature thermometer disposed in the vicinity of the optical fiber so as to measure a reference temperature of the optical fiber;
   an arithmetic controller that calculates a temperature of the optical fiber based on the backward Raman scattering light; and
   a temperature corrector that corrects the calculated temperature based on a non-linear correction formula containing the reference temperature as a parameter.

2. The device according to claim 1,
   wherein the temperature corrector receives the reference temperature from the reference temperature thermometer in real time.

3. The device according to claim 1,
   wherein the temperature corrector measures a reference temperature of the optical fiber using Rayleigh light and anti-Stokes light or Rayleigh light and Stokes light.

4. The device according to claim 1, further comprising:
   a temperature reference unit that measures a Raman shift angular frequency,
   wherein the non-linear correction formula contains as parameters the reference temperature, the Raman shift angular frequency measured by the temperature reference unit, a Raman shift angular frequency of the optical fiber, and a temperature calculated by the arithmetic controller in case of the reference temperature being used as a parameter.

5. The device according to claim 4,
   wherein the reference temperature thermometer is configured to measure a first reference temperature and a second reference temperature,
   wherein the arithmetic controller is configured to calculate a first temperature of the optical fiber when the first reference temperature is the reference temperature, and to calculate a second temperature of the optical fiber when the second reference temperature is the reference temperature, and wherein the Raman shift angular frequency of the optical fiber is calculated based on the first and second reference temperatures, the calculated first and second temperatures, and the Raman shift angular frequency measured by the temperature reference unit.

6. The device according to claim 4, wherein the non-linear correction formula comprises:

$$T_r = \frac{\omega_1}{\frac{\omega_r}{T} - \frac{\omega_r}{T_1'} + \frac{\omega_1}{T_1}},$$

wherein $T_1$ defines the reference temperature, wherein $\omega_r$ defines the Raman shift angular frequency measured by the temperature reference unit, wherein $\omega_1$ defines the Raman shift angular frequency of the optical fiber, wherein $T_1'$ defines the temperature calculated by the arithmetic controller, wherein $T$ defines the temperature calculated by the arithmetic controller, and wherein $T_r$ defines a true temperature of the optical fiber.

\* \* \* \* \*